United States Patent [19]

Sodhi

[11] Patent Number: 5,269,839
[45] Date of Patent: Dec. 14, 1993

[54] PROCESS FOR PRODUCING ALKYD RESINS

[75] Inventor: Jagdip-Singh Sodhi, Buxtehude, Fed. Rep. of Germany

[73] Assignee: Synthopol Chemie Dr. Rer. Pol. Koch GmbH & Co., KG, Buxtehude, Fed. Rep. of Germany

[21] Appl. No.: 910,403

[22] Filed: Jul. 8, 1992

Related U.S. Application Data

[60] Division of Ser. No. 538,311, Jun. 14, 1990, Pat. No. 5,158,608, which is a continuation-in-part of Ser. No. 313,894, Feb. 23, 1989, abandoned.

[51] Int. Cl.$^5$ .......................................... C09D 191/00
[52] U.S. Cl. .................................. 106/243; 106/244; 106/252; 528/295.5
[58] Field of Search .................. 528/295.5; 106/243, 106/252, 244

[56] References Cited

U.S. PATENT DOCUMENTS

| | | | |
|---|---|---|---|
| H643 | 6/1989 | Drury, Jr. | |
| 4,094,836 | 6/1978 | Yasui et al. | 260/22 |
| 4,497,933 | 2/1985 | Gorzinski et al. | 524/604 |
| 4,997,480 | 3/1991 | Rao | 106/243 |
| 5,004,779 | 4/1991 | Blum et al. | 106/252 |

OTHER PUBLICATIONS

Vrany, *Chemical Abstracts*, vol. 69, Abstract No. 97450g, (1968).
Casarett & Doull's *Toxicology: The Basic Science of Poisons*, 2nd Ed. Macmillan Publishing Co., NY (1980) pp. 266, 268-269.
Hawley's Condensed Chemical Dictionary, 11th Ed. (1987) pp. 36 and 934.
Cotton, *Advanced Inorganic Chem.*, Interscience Pub. NY (1972) pp. 394-400.

*Primary Examiner*—David Brunsman
*Attorney, Agent, or Firm*—Beveridge, DeGrandi, Weilacher & Young

[57] ABSTRACT

Alkyd resins, processes for their production, and their use are disclosed, these resins being distinguished by the fact that, in production, no organic solvents are used. The alkyd resins are clear and almost odorless and have a low viscosity. When used as a bonding agent in brush paints final products produced from these resins should not contain more than 10 to 15% by weight of organic solvents. The alkyd resins are obtainable from the following ingredients:

A) 58.90 to 75.25% by weight of drying fatty acids,
B) 7.00 to 16.25% by weight of pentaerythritol,
B') 0 to 3.00% by weight of glycerol
C) 0.07 to 1.40% by weight of hypophosphorous acid,
D) 5.00 to 29.00% by weight of trimellitic anhydride and
E) 0 to 5.00% by weight of triphenyl phosphite, where the components A), B), B'), C), and E) must make up 100% by weight.

5 Claims, No Drawings

PROCESS FOR PRODUCING ALKYD RESINS

This is a divisional of co-pending U.S. patent application Ser. No. 07/538,311 filed on Jun. 14, 1990 now U.S. Pat. No. 5,158,608 which application is a continuation-in-part of U.S. patent application Ser. No. 07/313,894, filed Feb. 23, 1989, now abandoned and both applications are entirely incorporated herein by reference.

BACKGROUND OF THE INVENTION

The present invention relates to alkyd resins, processes for their production, and their use. Such alkyd resins are especially suited for making environmentally benign paints, varnishes, and pigments.

SUMMARY OF THE INVENTION

The object of the present invention is to provide environmentally benign alkyd resins, which are distinguished by the following properties:
  i. no organic solvent is used in the production of the alkyd resins;
  ii. the alkyd resins are clear and almost odorless;
  iii. the finished solvent-free alkyd resins have such a low viscosity that they can be drawn off in the normal way; and
  iv. in the production of coating materials, the alkyd resins, when used as bonding agents, for example in brush paints for internal and external use, do not contain more than 10 to 15% by weight of organic solvents, particularly based on hydrocarbons (white spirit), in order to obtain paints with high solids content, good brushability, high gloss, good drying and good consistency, so that environmentally benign paints (varnishes, pigmented paints) with the given low solvent content are provided, conforming to the requirements of the Environmental Agency of Germany in Berlin for recognition by the quality designation "Blauer Engel" (Blue Angel).

This object is successfully achieved as described hereinbelow.

Fatty acids which are suitable for the alkyd resin according to the invention made from natural linoleic acid-rich drying oils are: soya oil fatty acid, sunflower oil fatty acid, tall oil fatty acid, safflower oil fatty acid, used individually or mixtures thereof.

The objects of this invention may be realized by providing an alkyd resin, obtainable from:
  A) 58.90 to 75.25% by weight of a monobasic acid, such as drying fatty acids,
  B) 7.00 to 16.255 by weight of pentaerythritol,
  B') 0 to 3.00% by weight of glycerol,
  C) 0.07 to 1.4% by weight of hypophosphorous acid,
  D) 5.00 to 29.00% by weight of a polycarboxylic anhydride, such as trimellitic anhydride, and
  E) 0 to 5.00% by weight of triphenyl phosphite, where the components A), B), B'), C), D), and E) must make up 100% by weight. The alkyd resins may be prepared by heating these ingredients followed by a dehydration-condensation.

A resin so produced may be included in an environmentally benign coating which contains no more than 10–15% by weight of organic solvent.

The preferred fatty acids are: tall oil fatty acid; sunflower oil fatty acid; and polyunsaturated fatty acids with an acid number of 198-202, an iodine number of 135-145, a setting point of 4°–8° C., 1% by weight max. of unsaponifiables, a color, measured in a Lovibond 5¼" cell, max. yellow 10.0; red 1.0; chain length distribution % $C14-C18=8$; $C18'=28$; $C18''=62$; $C18'''=1$; $>C18=1$; conjugated fatty acids (vegetable) with an acid number of 198-202, an iodine number $\geq 130$ (Wobum Method), a setting point $\leq 16$; 1% by weight of unsaponifiables, a color, measured in the Lovibond 5¼" cell, of yellow 10, red 1.0; approximate fatty acid composition saturated $C18=13\%$; saturated and unsaturated $C18=1\%$; unsaturated $C18'=24\%$; $C18''=11\%$; $C18'''=0$; conjugated $C18''=50\%$; conjugated $C18'''=1\%$.

In those countries in which tall oil fatty acid is available under particularly favorable conditions, tall oil fatty acid may be used as the particularly preferred fatty acid. An embodiment of the invention utilizing tall oil fatty acid is illustrated by Example 4.

DETAILED DESCRIPTION OF THE INVENTION

The production of the alkyd resins is carried out in reactors which are normally used in the synthetic resin industry. The components, except for trimellitic anhydride, are added to the reactor and heated to temperatures of 200° C. to 260° C. until the acid number reaches 15, preferably below 10. Generally, a heating time of from 3 to 5 hours is necessary to accomplish this.

Trimellitic anhydride and optionally triphenyl phosphite are then added in portions, in the course of 30 to 90 minutes with stirring, the temperature being maintained. As soon as the reaction is complete, which usually requires about 3 to 6 hours at 250° C., the reaction mixture, after the usual cooling to about 200° C., can be filtered. The end of the reactor can be detected by determination of the acid number. This acid number can be as high as 15, but the range below 10 is preferred, and acid numbers are between 5 and 10 are especially preferred. Moreover, at the end of the reaction, the viscosity at 25° C. is measured on a sample in an ICI plate-and-cone viscosimeter. Viscosities between 6000 and 2800 mPas/sec. are permissible. The preferred range is from 3000 to 3500 mPas/sec.

The process for producing an alkyd resin in accordance with the invention includes reacting (A) 58.90% to 75.25% by weight of natural, linoleic acid-rich drying fatty acid, (B) 7.00% to 16.25% by weight pentaerythritol, (B') 0 to 3.00% by weight glycerol, and (C) 0.07% to 1.4% by weight hypophosphorous acid, in a melt at temperatures in the range of 200° C. to 260° C. until the acid number is below 15. Subsequently, components (D) 5.00 to 29.00% by weight trimellitic anhydride and optionally, (E) 0 to 5.00% by weight triphenyl phosphite are added in portions, while the reaction temperature is maintained until components (D) and (E) have been incorporated.

The alkyd resins obtained can be converted to a paintable condition as air-drying coating materials, by the addition of 10 to 15% by weight of solvent or solvent mixtures which are normally used in the paint industry.

The coating materials which may be used according to the invention may optionally contain pigments, fillers, aids and drying agents. Each of the pigments, natural and synthetic, transparent and non-transparent, are suitable for use as pigments in accordance with the invention. The optimum proportion of pigment can be easily determined by those skilled in the art.

Examples of suitable drying agents are as follows: metal salts of (cyclo)aliphatic, natural or synthetic acids, such as, linoleic acid, naphthenic acid or 2-ethylhexanoic acid, wherein cobalt, manganese, lead, zirconium, calcium and zinc may be included as suitable metals. Mixtures of siccatives may also be used. Based on the proportion of metal, the drying agents are used in a preparation of 0.001 to about 3% by weight, based on the bonding agent solids.

The invention is explained by the following examples below. These examples are intended to be illustrative in nature, not limiting.

EXAMPLE 1

1214 g of sunflower oil fatty acid, 254 g of pentaerythritol and 22 g of hypophosphorous acid are heated in a flask, fitted with a water separator, stirrer and thermometer, under an inert gas to 235° C. and maintained at this temperature long enough for the acid number to fall to 7.3. Generally, a heating time of about 3 to 4 hours is necessary to attain this acid number. Then, 164 g of trimellitic anhydride is added in portions of about 30 to 40 grams at intervals of 15 to 30 minutes in the course of 60 to 220 minutes. After the final addition, the temperature is maintained at 235° C. long enough for the acid number to reach 15.0. The heating time required after the final addition of trimellitic anhydride was about 5 hours.

The viscosity of the alkyd resin so produced was 3100 mPas/sec at 25° C.

EXAMPLE 2

900 g of tall oil fatty acid, 357 g of a conjugated fatty acid (vegetable) (as expounded in the description above), 33 g of glycerol, 170 g of pentaerythritol and 3 g of hypophosphorous acid are heated in a flask, fitted with a water separator, stirrer and thermometer, under an inert gas to 250° C. and maintained at this temperature until the acid number reaches 6.5, for which about 120 minutes is required. Then, 585 g of trimellitic anhydride and 3 g of triphenyl phosphite are added in portions of about 20 g each addition, separated by 10 to 30 minutes, 30 to 60 minutes overall. After the final addition, the temperature is maintained at 250° C. long enough until the acid number reaches 4.9, for which 6 to 7 hours is required.

The viscosity of the final product was 3250 mPas/sec at 25° C.

EXAMPLE 3

The following components are added to a synthetic resin reactor: 2014 kg of sunflower oil fatty acid, 421 kg of pentaerythritol, 2 kg of hypophosphorous acid and 5 g of antifoaming agent.

The reactor is closed and air excluded by continuously purging the reactor with pure nitrogen. For this purpose, nitrogen is passed through the reactor vessel at 1 m³ per hour. Then the contents of the reactor are heated to 235° C. and maintained at this temperature long enough for the acid number to have fallen below 10. Then, a total amount of 272 kg of trimellitic anhydride is fed into the reactor in portions such that the entire amount is added within one hour at 235° C., and the contents of the reactor are further maintained at 235° C. until the acid number has fallen below 10. Then the resin is cooled to 80° C. and filtered. 2553 kg of alkyd resin is obtained. The viscosity, measured at 25° C., is 3300 mPas/sec. The acid number is below 10.

EXAMPLE 4

1214 g of tall oil fatty acid (iodine number according to Weiss is at least 160 and resin content is a maximum of 2% by weight), 254 g of pentaerythritol and 22 g of hypophosphorous acid are heated in a flask, fitted with a water separator, stirred and thermometer, under an inert gas to 235° C. and maintained at this temperature long enough until the acid number has fallen below 10. Generally, a heating time of 3 to 4 hours is required for this. Then 164 g of trimellitic anhydride is added in portions of about 30 to 40 grams at intervals of 15 to 30 minutes over the course of 60 to 220 minutes. After the final addition, the temperature is maintained at 235° C. until the acid number is 12.0. In order to reach this acid number the reaction mixture must be kept at 235° C. for about 7 to 8 hours.

The viscosity of the alkyd resin was 5,000 mPas/sec. at 25° C.

USE EXAMPLE 1

High solids content white brush paint:
The following ingredients are mixed:

| | | |
|---|---|---|
| a) | Alkyd resin according to Example 1 (100%) | 35.00 kg |
| b) | Titanium dioxide CL 310 | 40.00 kg |
| c) | Liquid solvent-free dispersant and brightening agent. In the preferred embodiment, Borchigen ND is used. | 0.50 kg |

This product is an ionic dispersant product which is free from sulfonic groups.

| | | |
|---|---|---|
| d) | Drying agent. In the preferred embodiment Soligen-calcium 10% (a metal soap, namely calcium octoate based on 2-ethyl hexanoic acid) is used. | 2.00 kg |
| e) | White spirit-Kristallol 60 (K60) in the preferred embodiment. | 3.00 kg |

These ingredients are mixed for 30 minutes in the ball mill, 1:1 with balls, with the addition of the following ingredients:

| | | |
|---|---|---|
| f) | Alkyd resin according to Example 1-100% | 15.00 kg |
| g) | Drying agents. In the preferred embodiment, these are: | |
| | Soligen-cobalt 6% | 0.40 kg |
| | Soligen-zirconium-6% | 0.7 kg |
| h) | White spirit-Kristallol 60 | 1.9 kg |
| i) | Antiskinning agent based on methyl ethyl ketoxime-Luaktin 50% in the preferred embodiment | 0.5 kg |
| j) | Methylpolysiloxane additive-this is a standard lacquer additive. Silicone oil A 1% in Kristallol 60 is used in the preferred embodiment. | 1.0 kg |

100 kilograms of a high solid content white brush paint product is obtained. The final product has the following properties:

| | |
|---|---|
| Viscosity/20° C. | = 350 sec. |
| Total solids content | = 92.15% |
| adjusted with 3.3% K60 | = 190 sec. |
| Total solids content | = 88.8% |
| Degree of dryness T1 | = 3 hours 50 minutes |
| Degree of dryness T2 | = 4 hours 10 minutes |
| Degree of dryness T3 | = 4 hours 20 minutes |

-continued

| | |
|---|---|
| Degree of dryness T4 | = 5 hours |
| Layer thickness | = ca 50 micrometers |
| Leveling | = free of streaks |
| Gloss angle 60° | = 95% |
| Color tone | = white |
| Pendulum hardness/7 days −23° C. | = 28 seconds. |

USE EXAMPLE 2

High solids content white brush paint:
The following ingredients are mixed:

| | | |
|---|---|---|
| a) | Alkyd resin according to Example 1 (100%) | 35.00 kg |
| b) | Titanium dioxide CL 310 | 40.00 kg |
| c) | Liquid solvent-free dispersant and brightening agent. In the preferred embodiment, Borchigen ND is used. | 0.50 kg |
| d) | Drying agent. In the preferred embodiment Soligen-calcium 10% is used. | 2.00 kg |
| e) | White spirit-Kristallol 60 in the preferred embodiment. | 3.00 kg |

These ingredients are mixed for 30 minutes in the ball mill, 1:1 with balls, with the addition of the following ingredients:

| | | |
|---|---|---|
| f) | Alkyd resin according to Example 2-100% | 17.50 kg |
| g) | Drying agents. In the preferred embodiment, Borders octa Soligen drier 69 is used. | 0.40 kg |
| h) | Methylpolysiloxane additive-this is a standard lacquer additive. Silicone oil A 1% in Kristallol 60 is used in the preferred embodiment. | 1.1 kg |
| i) | Antiskinning agent based on methyl ethyl ketoxime-Luaktin 50% in the preferred embodiment. | 0.5 kg |

100 kilograms of a high solid content white brush paint product is obtained. The final product has the following properties:

| | |
|---|---|
| Viscosity/20° C. | = 400 sec. |
| adjusted with 4.5% K60 | = 195 sec. |
| Solids content | = 90.5% |
| Degree of dryness T1 | = 4 hours 30 minutes |
| Degree of dryness T2 | = 5 hours |
| Degree of dryness T3 | = 5 hours 5 minutes |
| Degree of dryness T4 | = 5 hours 10 minutes |
| Layer thickness | = ca 40 micrometers |
| Color tone | = white |
| Leveling | = free of streaks |
| Gloss angle 60° | = 96% |
| Pendulum hardness/7 days −23° C. | = 30 sec. |

USE EXAMPLE 3

High solids content white brush paint based on alkyd resin according to Example 3.
The following ingredients are mixed:

| | | |
|---|---|---|
| a) | Alkyd resin according to Example 3 (100%) | 35.00 kg |
| b) | Titanium dioxide CL 310 | 40.00 kg |
| c) | Liquid solvent-free dispersant and brightening agent. Borchigen ND is preferred. | 0.50 kg |
| d) | Alkyd resin according to Example 3 (100%) | 15.00 kg |
| e) | Nuodex-Kombi ANE (1.2% Co; 2% Ca; 3.3% Zr) organic metallic in white spirit | 2.5 kg |

-continued

| | | |
|---|---|---|
| f) | White spirit-Kristallol 60 | 0.50 kg |
| g) | Methylpolysiloxane additive-preferrable silicone oil A in 1% Kristallol 60 | 1.00 kg |
| h) | Methyl ethyl ketoxime based antiskinning agent-preferrably Luaktin 50% | 0.50 kg |
| | Viscosity/20° C. (measured in a DIN cup with 4 mm opening) | 500 sec |
| | + 6% Kristallol 60 | 180 sec |

The unthinned and thinned solids contents are shown below.

| | |
|---|---|
| Solids content-unthinned | = 92.0% |
| Solids content-thinned | = 86.8% |

Other properties of the final product are as follows:

| | |
|---|---|
| Degree of dryness T1 | = 4 hours |
| Degree of dryness T2 | = 4 hours 5 minutes |
| Degree of dryness T3 | = 4 hours 20 minutes |
| Degree of dryness T4 | = 4 hours 50 minutes |
| Leveling | = free of streaks |
| Gloss at 60° angle | = 95% |
| Color tone | = white |
| Pendulum hardness/7 days −23° C. | = ca. 30 seconds |
| spread to 200 micrometers on glass with a doctor blade | = free of ripples |

The color tone of the paint product can be shifted toward white by addition of a pigment toner mask, such as 0.01% of Tint Ayd Al 234 A, available from the Daniel Products Co.

While the invention has been described in conjunction with various particular embodiments, modifications and changes may be made without departing from the spirit and scope of the inventions as defined in the following claims.

I claim:

1. A process for the production of an alkyd resin, comprising: reacting

A) 58.90% to 75.25% by weight of natural, linoleic acid-rich drying fatty acid,

B) 7.00% to 16.25% by weight of pentaerythritol,

B') 0 to 3.00% by weight of glycerol,

C) 0.07% to 1.4% by weight of hypophosphorous acid, in a melt at temperature in the range of 200° C. to 260° C. until the acid number is below 15: and subsequently adding the components, D) 5.00 to 29.00% by weight of trimellitic anhydride and E) 0 to 5.00% by weight of triphenyl phosphite in portions while maintaining the reaction temperature until the components D) and E) have been incorporated.

2. The process as defined in claim 1, wherein the reaction proceeds until the acid number is below 10.

3. The process as defined in claim 1, wherein the reaction proceeds until the acid number is in the range of 5 to 10.

4. The process as defined in claim 1, wherein the viscosity of the components after reaction is in the range of 2800 to 6000 mPas/sec.

5. The process as defined in claim 1, wherein the viscosity of the components after reaction is in the range of 3000 to 3500 mPas/sec.

* * * * *